United States Patent

Peppmoller et al.

Patent Number: 5,569,408
Date of Patent: Oct. 29, 1996

[54] NEW WATER-SOLUBLE, BIOLOGICALLY DECOMPOSABLE CARBONIC ACID POLYESTERS AND THEIR USE AS PREPARING AND SLIP ADDITIVES OF SYNTHETIC FIBRES

[75] Inventors: Reinmar Peppmoller, Krefeld; Bernhard Goossens, Weeze; Karl Winck, Neukirchen-Vluyn, all of Germany

[73] Assignee: Chemische Fabrik Stockhausen GmbH, Krefeld, Germany

[21] Appl. No.: 140,048

[22] PCT Filed: Apr. 23, 1992

[86] PCT No.: PCT/EP92/00894

§ 371 Date: Oct. 27, 1993

§ 102(e) Date: Oct. 27, 1993

[87] PCT Pub. No.: WO92/19664

PCT Pub. Date: Nov. 12, 1992

[30] Foreign Application Priority Data

Apr. 27, 1991 [DE] Germany .......................... 41 13 889.9

[51] Int. Cl.⁶ .................... C10M 119/16; C10M 145/38
[52] U.S. Cl. .................... 508/462; 528/297; 528/300; 528/301; 525/437; 428/364; 428/480; 427/11; 427/170; 427/412; 252/8.84; 252/8.86; 264/177.17
[58] Field of Search ........................ 528/272, 297, 528/300, 301; 525/437; 428/364, 480; 427/11, 170, 412; 252/52 A, 8.9, 56 R, 9, 49.3; 264/177.17

[56] References Cited

U.S. PATENT DOCUMENTS 3,338,830  8/1967  Stokes et al. ........................ 252/8.9
4,314,000  2/1982  Thir et al. ........................ 428/265

FOREIGN PATENT DOCUMENTS 0146234  6/1985  European Pat. Off. .
0421298  4/1991  European Pat. Off. .

*Primary Examiner*—Samuel A. Acquah
*Attorney, Agent, or Firm*—Foley & Lardner

[57] ABSTRACT

Water-soluble, biologically decomposable carbonic acid polyesters having the general formula (I):

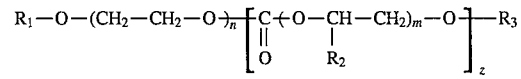

in which $R_1$ represents a straight- or branched-chain, saturated or monounsaturated alkyl residue having from 6 to 22 carbon atoms;

$R_2$ represents a hydrogen or methyl group;

$R_3$ represents hydrogen or the group:

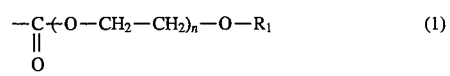

n is an integer between 0 and 10;
m is an integer between 5 and 16, and
z is an integer between 1 and 3 are disclosed.

The use of these compounds for preparation and lubricating agents for synthetic fibers is also disclosed.

12 Claims, No Drawings

NEW WATER-SOLUBLE, BIOLOGICALLY DECOMPOSABLE CARBONIC ACID POLYESTERS AND THEIR USE AS PREPARING AND SLIP ADDITIVES OF SYNTHETIC FIBRES

This application is a 371 of PCT/EP92/00894 filed Apr. 23, 1992.

The present invention relates to new water-soluble and biologically degradable carbonic acid polyesters (polycarbonates) and their use as preparation agents and lubricants for synthetic yarns.

To permit machine-processing of synthetic fibers and yarns made of polyester, polyamide, polypropylene, polyacrylonitrile, and even of regenerated cellulose at high speeds and without wear and breakage antistatic, friction-reducing oils having a low volatility and a high flash point are used. In general, thin-bodied water-insoluble mineral oils, ester oils, or polyether are used as base components for such "spinning assistants" (e.g., described in U.S. Pat. No. 3,338,830); they are adjusted to water-miscibility according to the respective requirements by means of emulsifiers.

As the rate of the mechanical processing of synthetic fibers increases, in particular if used under the severe conditions of friction texturizing, the mechanical and thermal stability of fiber processing agents has gained increasing importance. In case of products comprising mineral oil, undesired cracking residues or tarry deposits on the surfaces of heating rails frequently result in costly interruptions of production. A certain type of polyalkylene glycol ether carbonate has been proposed to solve this problem (Japanese Patent No. 195437/83 or European Patent No. 0146234). However, with respect to structure and synthesis only water-insoluble products or those emulsifiable in water could be obtained. The use of ethylene-(propylene)-oxide adducts of fatty alcohols which are self-emulsifiable in water proved to be advantageous, they could be present in the form of block or random adducts (with random sequences). However, due to their structure, they lacked both the wetting action and the biodegradability.

It is accordingly the object of the present invention to provide thin-bodied, water-soluble and biodegradable products having an excellent wetting action and high thermal stability and which are suitable for the use as spinning assistants, i.e., as preparation agents and lubricants for synthetic yarns.

Said object is achieved by new carbonic acid polyesters of the general formula:

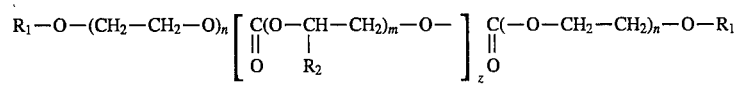

wherein:

$R_1$ is a linear or branched, saturated or mono-unsaturated alkyl residue with 6 to 22 C-atoms, $R_2$ is hydrogen or a methyl group $R_3$ is hydrogen or

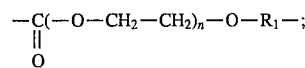

$n$ is an integer from 0 to 10, $m$ is an integer from 5 to 16, $z$ is an integer from 1 to 3.

As compared to the conventionally manufactured products, the new oligomeric low-viscosity carbonic acid esters of polyalkylene glycols have a lower solidification point, a more favorable consistency at room temperature, an improved hydrophilicity, they exhibit wetting action and are biodegradable.

The present invention is based on the surprising finding that by introducing ester groups in the form of carbonic acid ester groups the condensation of water-insoluble primary alcohols and partially water-soluble alkyl-poly-ethyleneglycol ethers of such alcohols with polyalkylene glycol can be carried out in such a manner that an intensification of the hydrophobic properties, as is normal in ester formations, does not occur and that instead water-soluble compounds result. As is usual for polycondensates, the monofunctional primary alcohol has a limiting effect on the molar mass of the total molecule. Thus the following structures result for the new fiber preparations:

a) complete condensation:

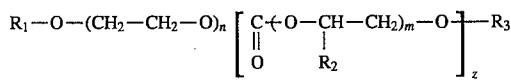

b) incomplete condensation:

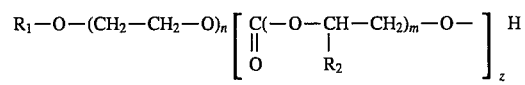

having the following meanings:

$R_1$: linear or branched, saturated or monounsaturated alkyl residue having 6 to 22 C-atoms, $R_2$: hydrogen or methyl group n: integer from 0 to 10, m: integer from 5 to 16, z: integer from 1 to 3.

The substituent $R_2$ contained in the polyalkylene glycol ether block may either be the same or different, if present repeatedly in each case. In the latter case they are adducts of ethylene and propylene oxide with block or random sequences.

The molecule obtained by complete condensation can be divided into a central hydrophilic block and two terminal hydrophobic residues. Therefore, polyethylene glycol is preferably used as condensation component. Adducts with propylene oxide comprise at least 80 mol-% of ethylene oxide since, otherwise, the hydrophilic properties and thus the wetting action of the polycarbonate would be weakened excessively.

The carbonic acid polyesters according to the present invention can be obtained in a simple manner by transesterifying carbonic acid esters of low-boiling alcohols, such as dimethyl carbonate and diethyl carbonate with polyalkylene glycols and high-molecular alcohols or the corresponding alkyl-(poly-)ethylene-glycol-ethers under alkali catalysis. The low-molecular alcohol is distilled off over a fractionating column. The reaction may be carried out either by presenting partial amounts or directly with the desired mixture of the hydroxy compounds. It is thus possible to produce higher-molecular dialkyl carbonate first and then bring it into equilibrium by reacting it with polyalkylene glycol and low-molecular dialkyl carbonate. After termination of the reaction, the alkaline catalyst has to be filtered off since it is insoluble in the product and creates turbidity. This can also be carried out without any difficulites when an alkaline-earth oxide, such as CaO, is used as transesterification catalyst.

On the other hand, the large-scale preparation of the high-molecular dialkyl carbonates or polycarbonates, respectively, may be effected by phosgenation of the alcohols and polyalkylene glycols, provided that there are safety precautions.

In order to manufacture polyalkylene glycols with alkylene oxide, a diol is usally used as starting substance; in the most simple case water or ethylene glycol is used. However, any other bivalent alcohol may be used, e.g., 1,2-propanediol, 1,3-propanediol, 1,2-butanediol, 1,4-butanediol, 1,6-hexylene glycol, diethylene glycol ether, or triethylene glycol ether.

Bases, such as sodium hydroxide, potassium hydroxide or mixtures thereof as well as special metal complexes, such as cobalt-hexacyano-cobaltate, are used as catalysts in this connection. The average molar mass of the polyether to be linked is limited to the maximum value of 800 according to the hydroxyl number, since higher molecular adducts in case of multiple linkage result in an undesired viscosity increase of the texturing fluid.

If polyalkylene glycols of ethylene and propylene oxide are used as central group, there are no limitations with respect to the molecular structure. Both block adducts and random adducts may be used whereby each bivalent diol may form the central unit.

Synthetic linear and branched primary alcohols having more than 6 C-atoms are suitable to limit the molar mass of the polyesters, examples include: hexanol, octanol, nonanol, decanol, undecanol, dodecanol, tridecanol, tetradecanol, pentadecanol, hexadecanol, heptadecanol, octadecanol, nonadecanol, eicosanol, heneicosanol and docosanol, as well as the linear alcohols obtained from natural fats, such as capronic alcohol, oenanthic alcohol, caprylic alcohol, pelargonic alcohol, capric alcohol, lauryl alcohol, myristyl alcohol, cetyl alcohol, stearyl alcohol, arachidyl alcohol and behenyl alcohol, as well as the monounsaturated ones, such as oleyl alcohol.

They may be used either in unchanged form or as hydroxyethylether, which is the addition product of ethylene oxide. The maximum mole number of ethylene oxide per mole alcohol is 10. Quantities exceeding this limit would result in a final product of excessive viscosity.

The water-soluble polycarbonates according to the present invention may be used as lubricating and preparing agents for synthetic fibers, in particular in the friction texturizing process step, without having to add or admix other components. Usual additives are antistatic agents, anticorrosives, foam inhibitors, preservatives and, optionally, solubilizers.

The polycarbonates are applied through metering pumps or preparation rollers directly during the spinning of the fibers after leaving the spinning cabinet. The compounds may be applied as substance or aqueous solution. In contrast to the oils used until today, emulsifiers need no longer be added due to the high water-solubility and the wetting characteristics. Since the condensation products are entirely biodegradable, there is no environmental impact when the preparation according to the present invention is partially washed off the fiber material during subsequent washing operations. Waste water treatment may therefore be effected according to the same standards as applied for commercial detergents and cleaners.

The following advantages are achieved by the present invention: As compared to the known water-emulsifiable oils, the slipping performance is improved due to the more even fiber wetting and surface coating. Furthermore, the use of a water-soluble and emulsifier-free oil at the same time results in a reduction of tarry and tacky deposits on all critical machine parts. Consequently, the processing of fine and finest yarns is facilitated and the electrostatic problems at high speeds are reduced.

The present invention will be illustrated in more detail by the following examples.
A) Production of the carbonic acid polyesters according to the present invention

EXAMPLE 1

In a glass flask equipped with stirrer, reflux condenser and thermometer 240 g decyl alcohol (Alfol 10, Condea AG) were refluxed for 2 hours with 150 g dimethyl carbonate and 8 g calcium oxide. Then the reflux condenser was replaced by a rectification column and the mixture was slowly heated to 100° C. under stirring. The methanol liberated by the transesterification reaction and the accompanying dimethyl carbonate were collected at the head of the column. Subsequently, 600 g polyethylene glycol having the molar mass of 400 and once again 100 g dimethyl carbonate were added. The mixture was refluxed again for 2 hours, the temperature was then increased to 120° C., whereby further quantities of a methanol/dimethyl carbonate mixture came over. Finally, vacuum was applied for a short period. After cooling to room temperature, the reaction product was filtered. It was a clear, colorless and thin-bodied oil.

EXAMPLE 2

In a glass equipment according to Example 1, 365 g ethoxylated decanol (2 moles ethylene oxide attached to Alfol 10, Condea AG) with 150 g dimethyl carbonate and 8 g calcium oxide were slowly refluxed under stirring first and then heated to 100° C., whereby liberating methanol together with dimethyl carbonate distilled off. Then 600 g polyethylene glycol (molar mass 400) and 100 g dimethyl carbonate were added and the mixture treated as in Example 1. After filtering off the catalyst, a clear thin-bodied and colorless oil resulted.

Example 3 and following ones:

The reaction conditions and the molar ratios of the reactants among each other were the same as described above. The components condensed with dimethyl carbonate can be taken from the following Table 1.

TABLE 1

|  | Reactant 1 | Reactant 2 |
|---|---|---|
| Example 3 | PEG 400 | 4 EO-ALFOL 10 |
| Example 4 | PEG 600 | n-dodecyl alcohol |
| Example 5 | PEG/PPG 600 (80/20, random) | 2 EO-ALFOL 10 |

Comparison of some product data with standard:

TABLE 2

| Fiber preparation | Standard* | 1 | 2 | 3 | 4 | 5 |
|---|---|---|---|---|---|---|
| Viscosity (Brookfield mPa*s) | 180 | 150 | 150 | 160 | 170 | 170 |
| Surface tension (mN/m, 10%) | 29 | 30 | 29 | 29 | 29 | 30 |
| Water-solubility (10%) | | | clear | | | |
| Cracking residue (220° C., 24 h, %) | 1 | 1 | 1 | 1 | 1 | 1 |

Standard* = Puropol FT 509 (Stockhausen GmbH). Since the product as such has no surface or interfacial activity, 2% of a nonionic wetting agent (ethoxylated fatty alcohol, Intrasol FA 1218/10) were added.

B) Use as spinning assistant:
a) Measurement of the coefficient of friction:

PES-filaments (terephthalate, 167 dtex 32 f) were prepared with polycarbonate according to Examples 1 to 5 from aqueous solution in such a way that an oil coat of 0.5% resulted.

After air conditioning for 24 hours at 20° C. and 65% relative humidity, the coefficient of sliding friction was determined by means of an F-meter (Rothschild), the friction body consisting of chromeplated and polished steel.

| | | Standard | 1 | 2 | 3 | 4 | 5 |
|---|---|---|---|---|---|---|---|
| Run 1: | Fiber/Metal 180°. | (50 m/min.); looping angle | | | | | |
| Run 2: | Fiber/Fiber 6 × 180°. | (20 m/min.); looping angle | | | | | |
| 1) | | 0.41 | 0.40 | 0.40 | 0.41 | 0.41 | 0.41 |
| 2) | | 0.31 | 0.31 | 0.30 | 0.30 | 0.31 | 0.31 | b) Manufacture of Polyester-POY (titer: 290 dtex 32 f):

The preparation was applied immediately after the molten polymer was discharged from the spinning nozzle in the spinning cabinet by dosing a 10% aqueous solution by means of metering pumps.

The winding speed amounted to 3,200 m/min. The preparation cover on the POY-material amounted to 0.4%.

c) Friction texturing (final titer 167 dtex 32 f):

The texturing was carried out under the following conditions:

| Heater length: | 2.0 m |
|---|---|
| Heater temperature: | 210° C. |
| Cooling plate: | 1.5 m |
| Friction unit: | 8 ceramic pieces |
| Drawing-off speed: | 700 m/min. |
| D/Y-ratio: | 2.2 |
| Stretch ratio: | 1.608 |

The following measured values were obtained:

| | | Examples 1 to 5 | | | | |
|---|---|---|---|---|---|---|
| | Standard | 1 | 2 | 3 | 4 | 5 |
| Strength (cN/dtex): | 3.63 | 3.65 | 3.66 | 3.64 | 3.66 | 3.64 |
| Elongation (%) | 25.0 | 25.0 | 25.1 | 25.1 | 25.2 | 25.1 |
| Shrinkage at the boil (%): | 8.5 | 8.7 | 8.7 | 8.6 | 8.7 | 8.6 |
| Crimp E (%) | 41.2 | 41.1 | 41.2 | 41.2 | 41.2 | 41.1 |
| Crimp K (%) | 24.7 | 24.9 | 24.9 | 24.8 | 24.7 | 24.8 |

After 10 days of continuous operation under the test conditions there were no deposits in the heater.

d) Biodegradability:

To examine the biodegradability the standard product and the polycarbonates according to Examples 1 to 5 were subjected to the "Confirmatory Test" according to OECD. After 28 days, the following results were obtained:

| | Standard | Examples 1 to 5 |
|---|---|---|
| Biological degradation (%) | 20 | 80 |

EXAMPLES 6 to 10

6) In a glass equipment according to Example 1, 366 g n-hexanol (6 moles ethylene oxide attached) were heated with 150 g dimethyl carbonate and 8 g calcium oxide. After 2 hours, 600 g polyethylene glycol (m=400) and 220 g dimethyl carbonate were added. The mixture was refluxed again for 2 hours, then the azeotrope of methanol and dimethyl carbonate was distilled off. Finally, a vacuum was applied for a short period. After cooling, the reaction product was filtered. A clear, bright, water-soluble oil resulted.

7) According to Example 6, 482 g 2-ethyl hexanol (8 moles ethylene oxide attached) were reacted with 300 g polyethylene glycol (m=600) and a total of 210 g (150/60) dimethyl carbonate. After the azeotropic mixture had been distilled and the catalyst removed, a bright oil was obtained which formed small amounts of a solid sediment during storage.

8) According to Example 6, 620 g oleyl alcohol (Ocenol 60/65, Henkel KGaA), reacted with 8 moles ethylene oxide, were heated with 150 g dimethyl carbonate and 8 g calcium oxide. Subsequently, 1,200 g polyethylene glycol (m=600) and, once again, 220 g dimethyl carbonate were added and the liberating methanol filtered off as azeotrope. After filtration of the product at 60° C., a wax was obtained which was soft at room temperature and water-soluble.

9) According to Example 6, 422 g n-decanol (Alfol 10, Condea AG), reacted with 6 moles ethylene oxide, were heated with 600 g polyethylene glycol (m=200) and 450 g dimethyl carbonate (150/300). After distillation of the azeotrope and separation of the catalyst, a bright, thin-bodied, water-soluble oil was obtained.

10) According to Example 6, 756 g n-behenyl alcohol (10 moles ethylene oxide attached) were reacted with 1,200 g polyethylene glycol (m=600) and a total of 370 g dimethyl carbonate. After processing at 60° C., a bright, water-soluble wax was obtained.

Test results of Examples 6 to 10:

| Fiber preparation | 6 | 7 | 8 | 9 | 10 |
|---|---|---|---|---|---|
| Viscosity (Brookf. mPa*s) | 180 | 150 | solid | 210 | solid |
| Surface tension (mN/m, 10%) | 29 | 28 | 29 | 30 | 30 |
| Solubility in water, 10% | | | clear | | |
| Cracking residue (220° C. 24 h, %) | 1 | 1 | 1 | 1 | 1 |

Coefficient of friction at a pretension of 17cN:

| | 6 | 7 | 8 | 9 | 10 |
|---|---|---|---|---|---|
| 1) | 0.41 | 0.41 | 0.39 | 0.40 | 0.39 |
| 2) | 0.31 | 0.30 | 0.30 | 0.31 | 0.31 |
| Strength (cN/dtex): | 3.65 | 3.62 | 3.66 | 3.65 | 3.63 |

| Elongation (%) | 25.1 | 25.3 | 25.0 | 25.1 | 25.2 |
| --- | --- | --- | --- | --- | --- |
| Shrinkage at the boil (%): | 8.6 | 8.7 | 8.5 | 8.6 | 8.7 |
| Crimp E (%) | 41.2 | 41.1 | 41.1 | 41.2 | 41.1 |
| Crimp K (%) | 24.8 | 24.9 | 24.8 | 24.7 | 24.8 |
| Biol. degrad. (%) | | | >80 | | |

Value of the coefficients n, m and z in Examples 1 to 10:

| Exam. | 1 | 2 | 3 | 4 | 5 | 6 | 7 | 8 | 9 | 10 |
| --- | --- | --- | --- | --- | --- | --- | --- | --- | --- | --- |
| n | 0 | 2 | 4 | 0 | 2 | 6 | 8 | 8 | 6 | 10 |
| m | 9 | 9 | 9 | 14 | 13.5 | 9 | 14 | 14 | 5 | 14 |
| z | 2 | 2 | 2 | 2 | 2 | 3 | 1 | 4 | 6 | 4 |

We claim:

1. Water-soluble, biodegradable carbonic acid polyesters of the general formula (I):

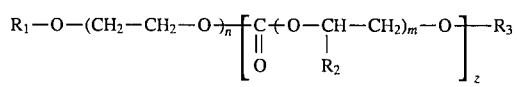

wherein:

$R_1$ is a linear or branched, saturated or monounsaturated alkyl residue with from 6 to 22 carbon atoms;

$R_2$ is hydrogen or a methyl group;

$R_3$ is hydrogen or the group:

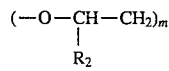

n is an integer from 0 to 10;

m is an integer from 5 to 16, and z is an integer from 1 to 3, and wherein the polyalkylene glycol sequence of the formula

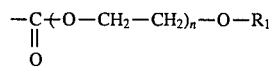

consists of polyethylene glycol groups or consists of at least 80 mole % ethylene oxide units and at maximum 20 mol % propylene oxide units.

2. Carbonic acid polyesters according to claim 1, wherein the polyalkylene glycol sequence of the formula

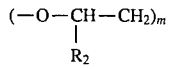

consists of a polyethylene glycol initiated with water or a diol selected from the consisting of ethylene glycol, 1,2-propanediol, 1,3-propanediol, 1,2-butanediol, 1,4-butanediol, 1,6-hexylene glycol, diethylene glycol ether, and triethylene glycol ether.

3. Carbonic acid polyesters according to claim 1 characterized in that the polyalkylene glycol sequence of the formula

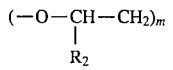

of the carbonic acid polyester consists of at least 80 mol-% ethylene oxide units and at maximum 20 mol-% propylene oxide units.

4. Carbonic acid polyesters according to claim 1 characterized in that a 10%-wt. aqueous solution thereof reduces the surface tension of the water to at least 35 mN/m.

5. Carbonic acid polyesters according to claim 1, obtained by the condensation of primary alcohols or alkyl(poly)-ethylene glycol ethers and polyalkylene glycols with phosgene or with a low-molecular weight dialkyl carbonate selected from the group consisting of dimethyl carbonate and diethyl carbonate.

6. A preparation agent for synthetic fibers comprising a carbonic acid polyester according to claim 1.

7. A spinning assistant according to claim 6, further comprising one or more additional components selected from the group consisting of antistatic agents, anticorrosives, foam inhibitors, preservatives and solubilizers.

8. A lubricating agent for synthetic fibers comprising a carbonic acid polyester according to claim 1.

9. A spinning assistant for synthetic fibers comprising a carbonic acid polyester according to claim 1.

10. A process for machine-processing synthetic fibers comprising the use of a spinning assistant, wherein said spinning assistant comprises a carbonic acid polyester according to claim 1.

11. A process according to claim 10, wherein said spinning assistant further comprises one or more additional components selected from the group consisting of antistatic agents, anticorrosives, foam inhibitors, preservatives and solubilizers.

12. Carbonic acid polyesters according to claim 1 wherein $R_3$ is hydrogen.

* * * * *